US012759645B2

(12) United States Patent
Song et al.

(10) Patent No.: US 12,759,645 B2
(45) Date of Patent: Oct. 13, 2026

(54) JOINT STRUCTURE FOR VEHICLE BODY

(71) Applicants: Hyundai Motor Company, Seoul (KR); Kia Corporation, Seoul (KR)

(72) Inventors: Won Ki Song, Seongnam-si (KR); Jung Taek Lim, Gwangmyeong-si (KR); Jaeseung Lee, Hwaseong-si (KR); Sun Hyung Cho, Suwon-si (KR); Dae Hee Lee, Incheon (KR); Jin Ho Hwang, Cheonan-si (KR); Joonghyun Shin, Hwaseong-si (KR); Hyungsik Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 269 days.

(21) Appl. No.: 18/762,249

(22) Filed: Jul. 2, 2024

(65) Prior Publication Data

US 2025/0091661 A1 Mar. 20, 2025

(30) Foreign Application Priority Data

Sep. 20, 2023 (KR) ........................ 10-2023-0125389

(51) Int. Cl.
*B62D 27/02* (2006.01)

(52) U.S. Cl.
CPC .................................. *B62D 27/023* (2013.01)

(58) Field of Classification Search
CPC .... B62D 27/023; B62D 27/06; B62D 63/025; B62D 25/06; B62D 25/08; B60R 13/08
See application file for complete search history.

(56) References Cited

U.S. PATENT DOCUMENTS

| | | | | |
|---|---|---|---|---|
| 3,888,539 | A * | 6/1975 | Niessner | B60P 3/34 296/156 |
| 6,582,013 | B1 * | 6/2003 | Inoue | B62D 25/06 296/214 |
| 11,091,204 | B2 * | 8/2021 | Nakayama | B62D 27/023 |
| 2016/0082816 | A1 * | 3/2016 | Ayukawa | B62D 65/06 29/464 |
| 2017/0028900 | A1 * | 2/2017 | Stocks | B62D 63/025 |
| 2021/0171124 | A1 * | 6/2021 | Kim | B62D 25/04 |
| 2021/0331749 | A1 * | 10/2021 | Hwang | B62D 24/00 |
| 2022/0017019 | A1 * | 1/2022 | Subramanian | B60Q 1/2623 |
| 2022/0135158 | A1 * | 5/2022 | Lee | B60L 53/80 180/58 |
| 2022/0194482 | A1 * | 6/2022 | Song | B62D 24/00 |
| 2022/0204099 | A1 * | 6/2022 | Cho | B62D 24/00 |

* cited by examiner

*Primary Examiner* — Yanick A Akaragwe
(74) *Attorney, Agent, or Firm* — Slater Matsil, LLP

(57) ABSTRACT

An embodiment joint structure for a vehicle body includes a front body module that is a stationary part fixable to a front part of an under body of the vehicle body, a rear body module that is a variable part having a preset shape, the rear body module being attachable to and detachable from a rear part of the under body and a rear part of the front body module, a plurality of stationary part coupling modules disposed on an upper end surface portion of a rear edge of the front body module, and a plurality of variable part coupling modules disposed on an upper end surface portion of a front edge of the rear body module and couplable to the stationary part coupling modules by an electromagnetic force.

20 Claims, 17 Drawing Sheets

JOINT STRUCTURE FOR VEHICLE BODY

CROSS-REFERENCE TO RELATED APPLICATIONS

This application claims the benefit of Korean Patent Application No. 10-2023-0125389, filed on Sep. 20, 2023, which application is hereby incorporated herein by reference.

TECHNICAL FIELD

The present disclosure relates to a joint structure for a vehicle body.

BACKGROUND

Recently, future mobility visions with new concepts for implementing human-oriented dynamic future cities have been introduced in vehicle industries. One of the future mobility solutions is a purpose-built vehicle (PBV) as a purpose-based mobility vehicle.

Examples of the PBV may include an environmental-friendly movable vehicle based on an electric vehicle (EV). The PBVs may provide various customized services to users while the PBVs move from starting points to destinations in an unmanned or manned autonomous driving manner.

A vehicle body of the PBV includes an under body (also called a chassis frame, a rolling chassis, or a skateboard in the art), and an upper body assembled to the under body.

In this case, the upper body may have various shapes depending on the type of customized service provided by the PBV. For example, the PBV may be used as a hailing type vehicle having cabins respectively disposed at front and rear sides of the upper body. Further, the PBV may also be used as a cab type vehicle having a cabin only provided at the front side of the upper body. Furthermore, the PBV may also be used as a delivery type vehicle having a cabin provided at the front side of the upper body and a luggage room provided at the rear side.

In the related art described above, costs may increase because the structures of the upper body need to be changed to conform to various types of customized services provided by the PBV. Therefore, there is a need to develop a joint structure for a vehicle body that may change to various types of vehicle bodies depending on the types of customized services provided by the PBV.

SUMMARY

The present disclosure relates to a joint structure for a vehicle body. Particular embodiments relate to a joint structure for a vehicle body of a purpose-built vehicle (PBV), the joint structure including a stationary part and a variable part.

Embodiments of the present disclosure provide a joint structure for a vehicle body in which a front part and a rear part of an upper body are configured to be detachable and rigidity and vibration insulation are ensured at a portion where the front part and the rear part of the upper body are attached or detached.

A joint structure for a vehicle body according to an embodiment of the present disclosure includes a front body module that is a stationary part fixed to a front part of an under body of a vehicle, a rear body module that is a variable part having a preset shape and configured to be attached to or detached from a rear part of the under body and a rear part of the front body module, a plurality of stationary part coupling modules installed on an upper end surface portion of a rear edge of the front body module, and a plurality of variable part coupling modules installed on an upper end surface portion of a front edge of the rear body module and coupled to the stationary part coupling modules by an electromagnetic force.

A variable part center roof rail may be installed on an upper portion of the front edge of the rear body module and extend in a direction perpendicular to a longitudinal direction of the vehicle, and the plurality of variable part coupling modules may be installed on the variable part center roof rail.

The variable part center roof rail may define a space opened at an upper side thereof, a variable part roof panel may be coupled to an upper portion of the variable part center roof rail and cover the opened space, and a lower portion of the variable part center roof rail may be supported by a weather strip mounting bracket.

The plurality of variable part coupling modules may include a variable part center bulkhead installed on a front surface of the variable part center roof rail, a variable part magnetic member mounted on the variable part center bulkhead, and variable part side bulkheads installed in a space of the variable part center roof rail.

The variable part center bulkhead may be coupled to a surface of the rear body module of the variable part center roof rail that is directed forward, the magnetic member may be coupled to a front surface of the variable part center bulkhead, the variable part side bulkheads may be coupled to rear surfaces at two opposite sides of the variable part center bulkhead, and the variable part center bulkhead, the variable part magnetic member, and the variable part side bulkheads may be fixed to the variable part center roof rail by bolt members.

A pair of variable part first left and right center roof rails may be coupled to a central portion of a rear surface of the variable part center roof rail and extend in a direction perpendicular to an extension direction of the variable part center roof rail, and the pair of variable part first left and right center roof rails may extend and be connected to a central portion of a rear roof rail at a rear side of the vehicle body.

A pair of rear roof side members may be coupled to two opposite side portions of the rear surface of the variable part center roof rail and extend in the direction perpendicular to the extension direction of the variable part center roof rail.

Two opposite sides of central portions of the variable part first left and right center roof rails may be connected by lateral surfaces of the rear roof side members and variable part second left and right center roof rails.

A variable part rubber bushing may be coupled to a front surface of the variable part center bulkhead and cover the variable part magnetic member, and an opening may be formed in a central portion of the variable part rubber bushing so that the variable part magnetic member is exposed.

An end of the variable part center bulkhead may be fitted with an end of the variable part rubber bushing.

An end of the variable part center roof rail, an end of the variable part center bulkhead, and an end of the variable part roof panel may overlap one another at an upper side of the variable part rubber bushing.

A stationary part center roof rail may be installed on an upper portion of the rear edge of the front body module and extend in a direction perpendicular to a longitudinal direction of the vehicle, and the plurality of stationary part coupling modules may be installed on the stationary part center roof rail.

The stationary part center roof rail may define a space opened at an upper side thereof, and a stationary part roof panel may be coupled to an upper portion of the stationary part center roof rail and cover the opened space.

The plurality of stationary part coupling modules may include a stationary part center bulkhead installed on a rear surface of the stationary part center roof rail, a stationary part magnetic member mounted on the stationary part center bulkhead, and a stationary part side bulkhead installed in a space of the stationary part center roof rail.

A pair of stationary part first left and right center roof rails may be coupled to a central portion of a front surface of the stationary part center roof rail and extend in a direction perpendicular to an extension direction of the stationary part center roof rail, and the pair of stationary part first left and right center roof rails may extend and be connected to a central portion of a front roof rail at a front side of the vehicle body.

A pair of front roof side members may be coupled to two opposite side portions of the front surface of the stationary part center roof rail and extend in the direction perpendicular to the extension direction of the stationary part center roof rail.

A stationary part rubber bushing may be coupled to a rear surface of the stationary part center bulkhead and cover the stationary part magnetic member, and an opening may be formed in a central portion of the stationary part rubber bushing so that the stationary part magnetic member is exposed.

An end of the stationary part center bulkhead may be fitted with an end of the stationary part rubber bushing.

An end of the stationary part center roof rail may be fixed to a front vehicle body by a stationary part center roof rail extension member.

An end of the stationary part center roof rail, an end of the stationary part center bulkhead, and an end of the stationary part center roof rail extension member may overlap one another at a lower side of the stationary part rubber bushing.

According to an embodiment of the present disclosure, it is possible to reduce costs required to change the upper body structure of the vehicle body to conform to various types of customized services provided by the PBV.

In addition, the structure of the vehicle body including the bulkhead, the center roof rail, the left and right center roof rails, and the rear roof rail is applied, such that the coupling rigidity and framework rigidity of the front body module and the rear body module, which may be attached to or detached from each other, may be ensured, and the mounting rigidity of the magnetic joint structure may be ensured.

In addition, the rubber bushing, which surrounds the magnetic member, may be applied, such that vibration of the magnetic joint structure may be absorbed, and electromagnetic waves may be blocked.

DETAILED DESCRIPTION OF ILLUSTRATIVE EMBODIMENTS

Figure 1:
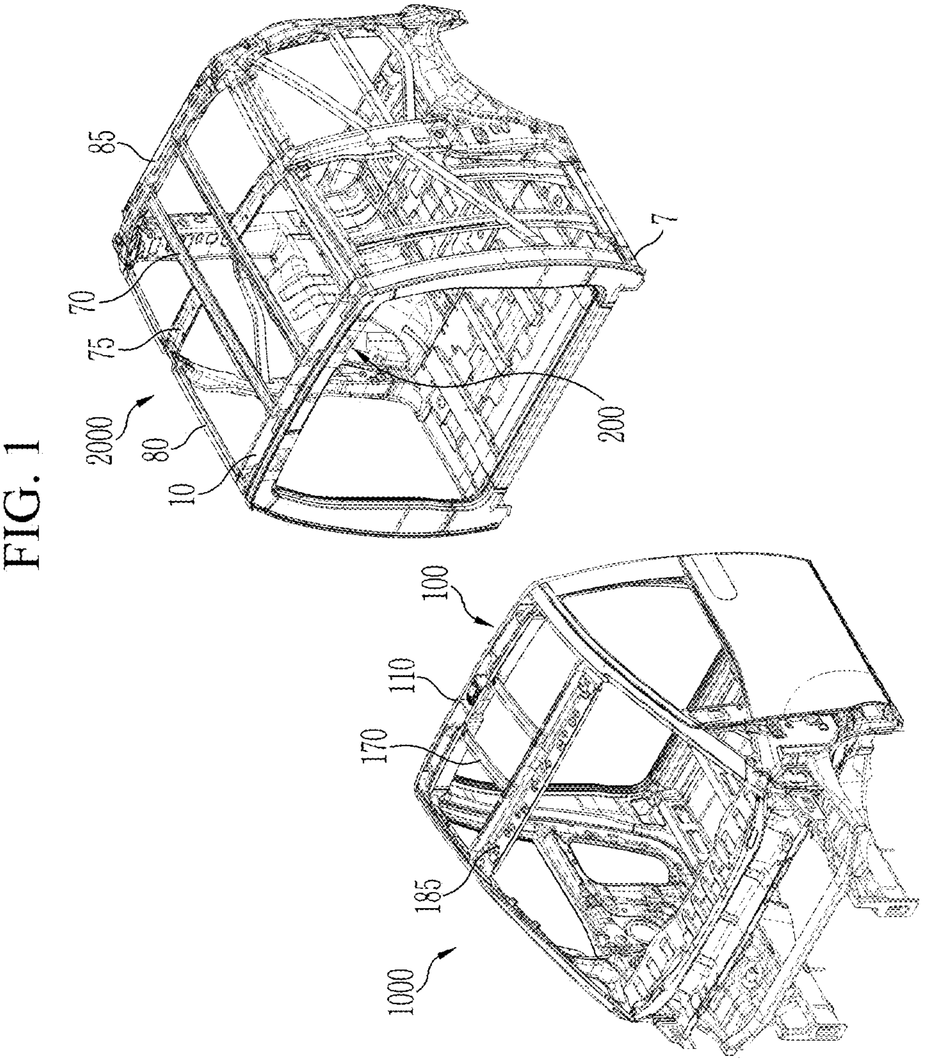
FIG. 1 is a perspective view illustrating a joint structure for a vehicle body according to an embodiment of the present disclosure.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways and is not limited to the embodiments described herein.

In addition, the constituent elements having the same configurations in several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements, or components illustrated in two or more drawings in order to exhibit similar characteristics. When one component is described as being positioned "above" or "on" another component, one component can be positioned "directly on" another component, and one component can also be positioned on another component with other components interposed therebetween.

The embodiments of the present disclosure specifically illustrate examples of the present disclosure. As a result, various modifications of the drawings are expected. Therefore, the embodiments are not limited to specific forms in regions illustrated in the drawings, and for example, include modifications of forms by the manufacture thereof.

Hereinafter, a joint structure for a vehicle body according to embodiments of the present disclosure will be described in detail with reference to the accompanying drawings.

Figure 2:
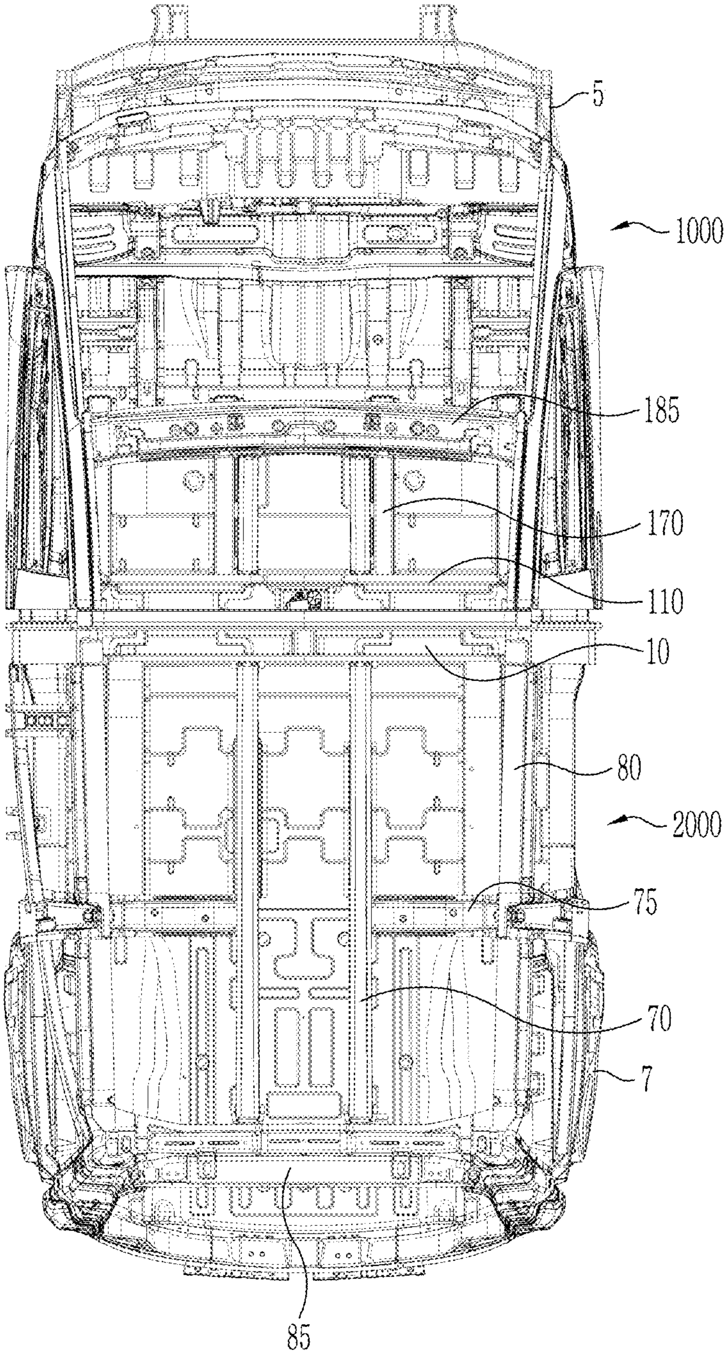
FIG. 2 is a top plan view illustrating a state made after the joint structure for a vehicle body according to an embodiment of the present disclosure is coupled when viewed from above.

FIG. 1 is a perspective view illustrating a joint structure for a vehicle body according to an embodiment of the present disclosure, and FIG. 2 is a top plan view illustrating a state made after the joint structure for a vehicle body according to an embodiment of the present disclosure is coupled when viewed from above.

With reference to FIGS. 1 and 2, for example, the joint structure for a vehicle body according to an embodiment of the present disclosure may be applied to a purpose-built mobility vehicle (hereinafter, referred to as a 'PBV').

The PBV may be used as a life module vehicle based on an electric vehicle that provides a user with various customized services while the PBV moves from a starting point to a destination.

In an embodiment, the PBV may be manufactured to have a one-box type design having a large interior space. Furthermore, face-to-face type seats may be applied to the interior space of the PBV.

A vehicle body of the PBV is a vehicle body suitable for small-quantity production of various types of vehicles having a small number of components. The vehicle body of the PBV may be manufactured to have various shapes and sizes.

Furthermore, the vehicle body of the PBV includes a skate-board type under body (also typically called a 'rolling chassis' or a 'chassis frame' by those skilled in the art) and an upper body assembled to the under body.

The under body may be equipped with components such as a battery assembly and a drive motor. Further, the upper body may be a body-in-white (BIW) body coupled to the under body and may include a luggage room and a cabin having a large interior space.

The joint structure for a vehicle body according to an embodiment of the present disclosure has a structure in which the upper bodies with various shapes and purposes may be applied to the under body depending on types of customized services provided by the PBV.

To this end, the joint structure for a vehicle body according to an embodiment of the present disclosure includes a front body module 1000 and a rear body module 2000 as the upper bodies.

In an embodiment of the present disclosure, the front body module 1000 includes a cab-type front cabin. The front body module 1000 may be fixed to a front part of the under body.

In an embodiment of the present disclosure, the rear body module 2000 includes a rear cabin or a luggage room. The rear body module 2000 is detachably provided on a rear part of the under body and a rear part of the front body module 1000.

In this case, the rear body module 2000 may be attached to or detached from the rear part of the under body in an upward/downward direction. Further, the rear body module 2000 may be attached to or detached from the rear part of the front body module 1000 in a forward/rearward direction of the vehicle body. The rear body module 2000 may be manufactured in various shapes depending on the use of the PBV.

The front body module 1000 is equipped with a plurality of stationary part coupling modules 100, and the rear body module 2000 is equipped with a plurality of variable part coupling modules 200. The plurality of stationary part coupling modules 100 may be installed on an upper end surface portion of a rear edge of the front body module 1000, and the plurality of variable part coupling modules 200 may be installed on an upper end surface portion of a front edge of the rear body module 2000. The stationary part coupling modules 100 and the variable part coupling modules 200 may be provided at positions corresponding to and facing one another and coupled to one another by an electromagnetic force when the front body module 1000 and the rear body module 2000 are coupled.

A variable part center roof rail 10 may be installed on an upper portion of a front edge of the rear body module 2000 and may extend in a direction perpendicular to a longitudinal direction of the vehicle. The plurality of variable part coupling modules 200 may be installed on the variable part center roof rail 10.

In addition, a stationary part center roof rail 110 may be installed on an upper portion of a rear edge of the front body module 1000 and extend in the direction perpendicular to the longitudinal direction of the vehicle. The plurality of stationary part coupling modules 100 may be provided on the stationary part center roof rail 110.

In addition, variable part first left and right center roof rails 70, which are connected to a rear side of the variable part center roof rail 10, rear roof side members 80, variable part second left and right center roof rails 75, and a rear roof rail 85 are provided on an upper portion of a rear vehicle body 7 of the rear body module 2000 and define an overall framework of an upper portion of the rear body module 2000.

In addition, stationary part first left and right center roof rails 170, which are connected to a front side of the stationary part center roof rail 110, and a front roof rail 185 are provided on an upper portion of a front vehicle body 5 of the front body module 1000 and define an overall framework of an upper portion of the front body module 1000.

Figure 3:
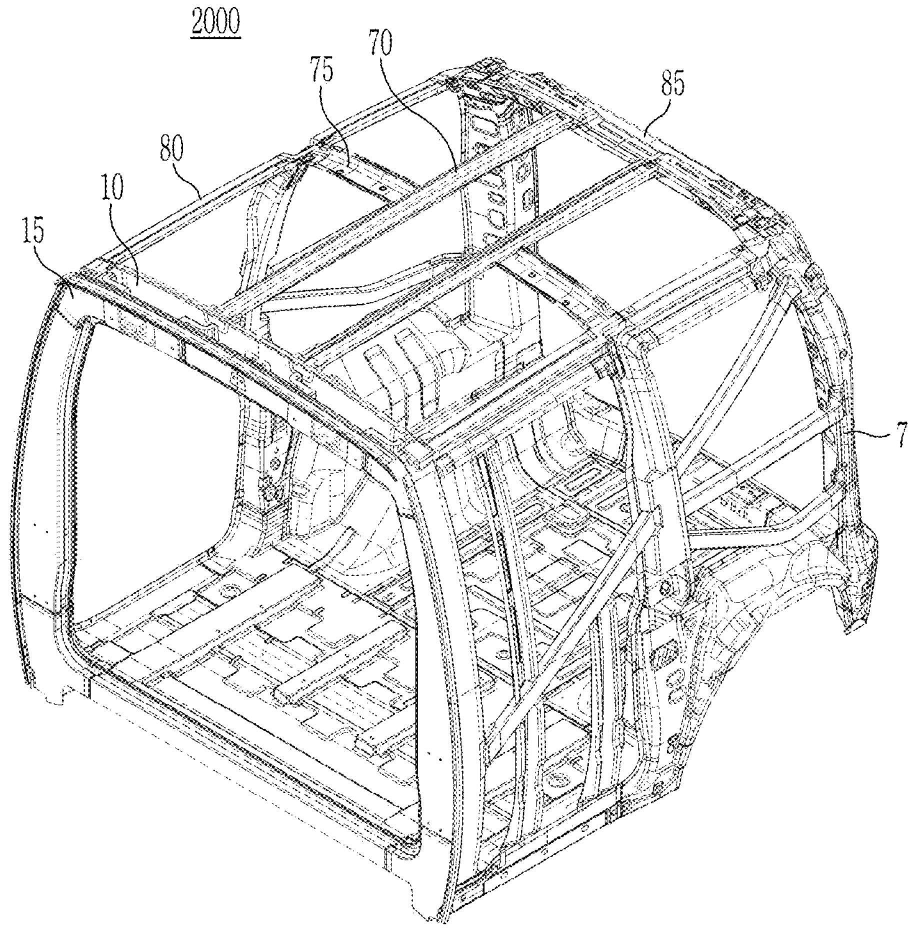
FIG. 3 is a perspective view illustrating a rear body module of the joint structure for a vehicle body according to an embodiment of the present disclosure.

FIG. 3 is a perspective view illustrating the rear body module of the joint structure for a vehicle body according to an embodiment of the present disclosure.

With reference to FIG. 3, the variable part center roof rail 10 is provided on the upper portion of the front edge of the rear body module 2000 and extends in the direction perpendicular to the longitudinal direction of the vehicle. In addition, the plurality of variable part coupling modules 200 is installed on the variable part center roof rail 10.

The pair of variable part first left and right center roof rails 70 may be coupled to a central portion of a rear surface of the variable part center roof rail 10 and extend in a direction perpendicular to an extension direction of the variable part center roof rail 10. The rear surface of the variable part center roof rail 10 and the variable part first left and right center roof rails 70 may be connected to one another by way of center rail coupling members 19. The variable part first left and right center roof rails 70 extend toward a rear side of the vehicle body and are connected to the rear roof rail 85 at the rear side of the vehicle body. The rear roof rail 85 extends in a direction approximately parallel to the variable part center roof rail 10, and two opposite sides of the rear roof rail 85 are connected and fixed to two opposite sides of the rear vehicle body 7 of the rear body module.

Meanwhile, the pair of rear roof side members 80 may be coupled to two opposite side portions of the rear surface of the variable part center roof rail 10 and may extend in the direction perpendicular to the extension direction of the variable part center roof rail 10. In addition, two opposite sides of central portions of the variable part first left and right center roof rails 70 may be connected by lateral surfaces of the rear roof side members 80 and the variable part second left and right center roof rails 75.

Figure 4:
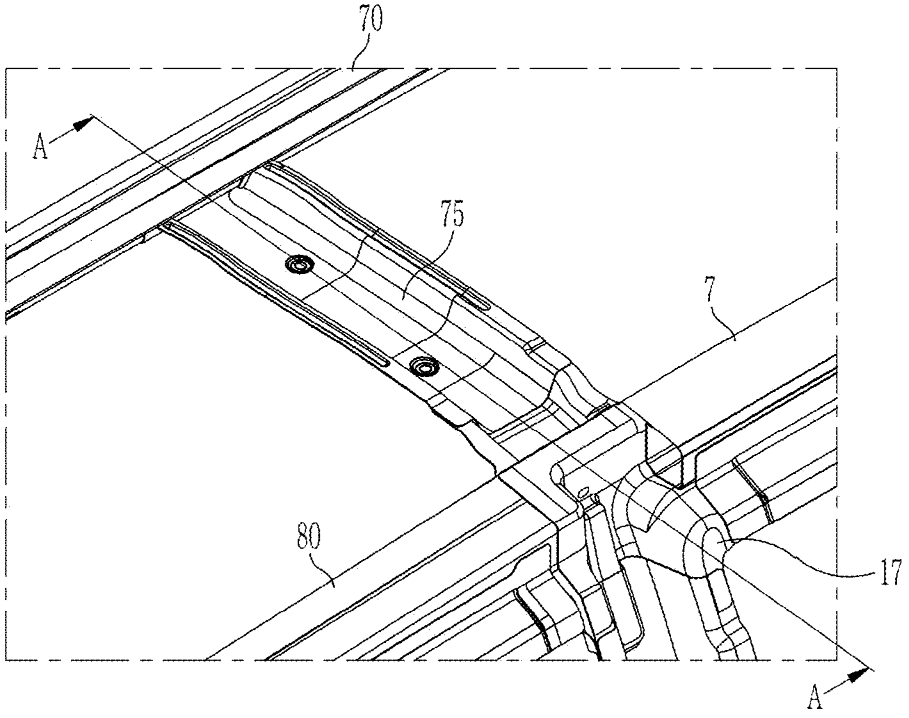
FIG. 4 is a view illustrating a coupling relationship between variable part left and right center roof rails of the joint structure for a vehicle body according to an embodiment of the present disclosure.
Figure 5:
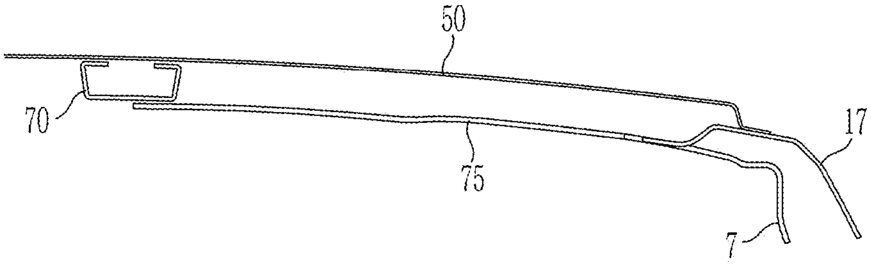
FIG. 5 is a cross-sectional view taken along line 'A-A' in FIG. 4.

FIG. 4 is a view illustrating a coupling relationship between the variable part left and right center roof rails of the joint structure for a vehicle body according to an embodiment of the present disclosure, and FIG. 5 is a cross-sectional view taken along line 'A-A' in FIG. 4.

With reference to FIG. 4, the rear roof side member 80 and the upper portion of the rear vehicle body 7 of the rear body module 2000 are connected to each other by a roof side gusset 17 and extend in the longitudinal direction of the rear body module 2000.

One end of each of the variable part second left and right center roof rails 75 is connected to each of the variable part first left and right center roof rails 70, and the other end of each of the variable part second left and right center roof rails 75 is connected to the roof side gusset 17. The variable part second left and right center roof rails 75 may serve to reinforce rigidity of the variable part first left and right center roof rails 70.

As illustrated in FIG. 5, one end of each of the variable part second left and right center roof rails 75 is coupled to a lower surface of each of the variable part first left and right center roof rails 70, and the other end of each of the variable part second left and right center roof rails 75 is connected to the rear vehicle body 7 of the rear body module 2000 by way of the roof side gusset 17. Further, a variable part roof panel 50 is coupled to the variable part first left and right center roof rails 70 and upper portions of the roof side gussets 17.

The structure of the rear body module 2000 illustrated in FIGS. 3 to 5 serves to effectively transmit and disperse a magnetic fastening load at the time of coupling the vehicle body. The fastening load of the magnetic member may be transmitted and dispersed to the variable part second left and right center roof rails 75 and the rear roof rail 85 via variable part center bulkheads 20, variable part side bulkheads 40, the variable part center roof rail 10, and the variable part first left and right center roof rails 70, thereby improving rigidity in the forward/rearward direction and the leftward/rightward direction.

Figure 6:
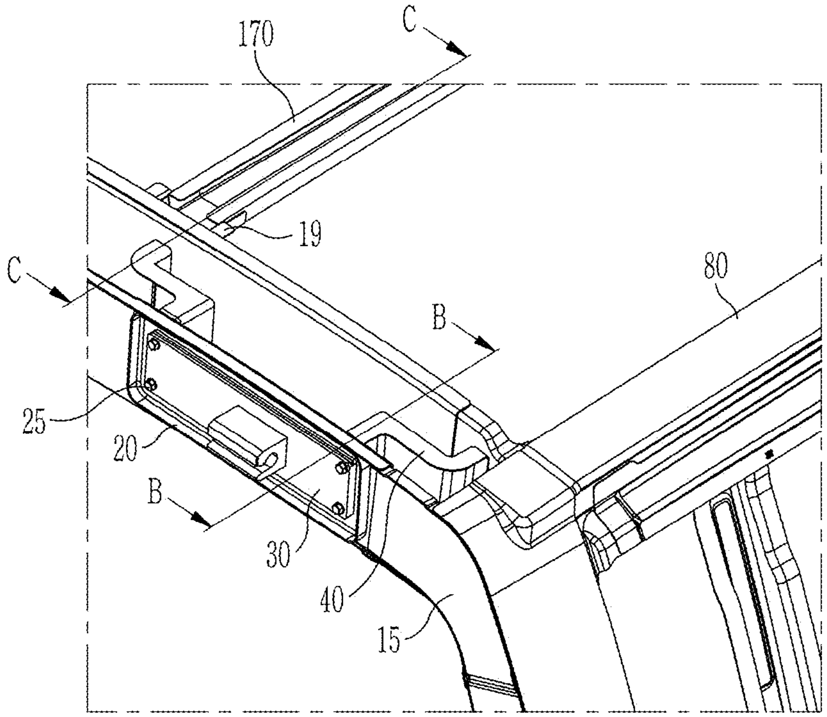
FIG. 6 is a perspective view illustrating a state in which a variable part coupling module of the joint structure for a vehicle body according to an embodiment of the present disclosure is installed on the variable part center roof rail.
Figure 7:
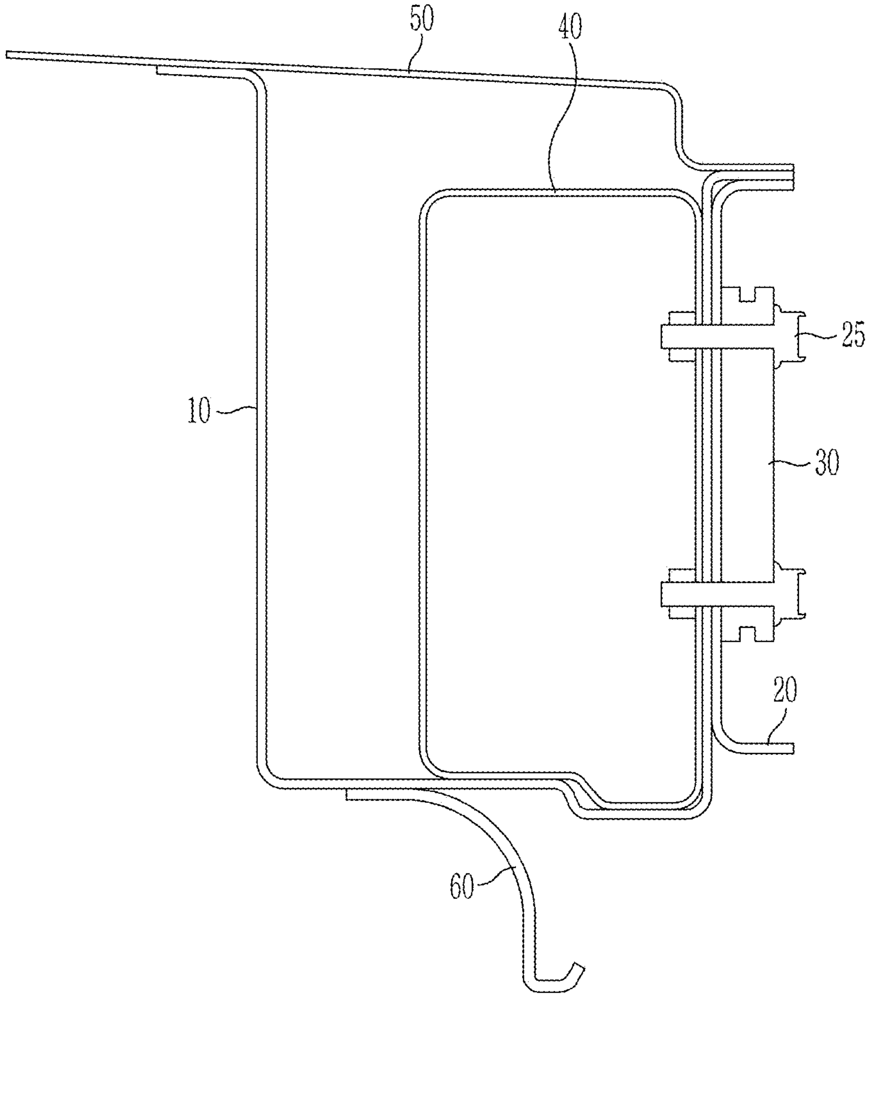
FIG. 7 is a cross-sectional view taken along line 'B-B' in FIG. 6.
Figure 8:
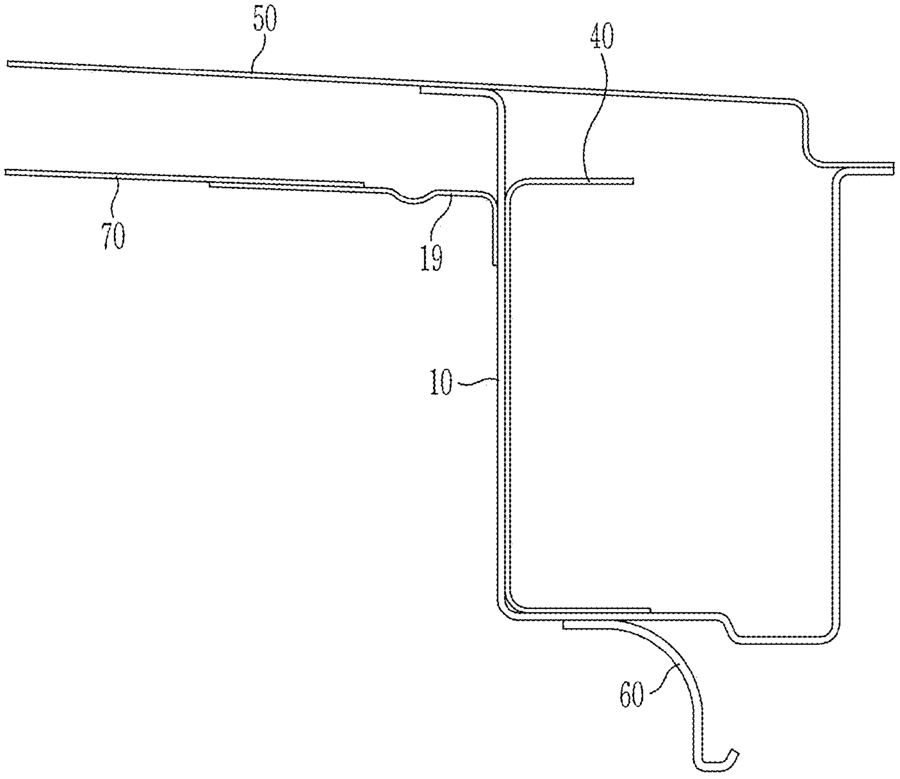
FIG. 8 is a cross-sectional view taken along line 'C-C' in FIG. 6.

FIG. 6 is a perspective view illustrating a state in which the variable part coupling module of the joint structure for a vehicle body according to an embodiment of the present disclosure is installed on the variable part center roof rail, FIG. 7 is a cross-sectional view taken along line 'B-B' in FIG. 6, and FIG. 8 is a cross-sectional view taken along line 'C-C' in FIG. 6.

With reference to FIG. 6, the plurality of variable part coupling modules 200 may include the variable part center bulkhead 20, a variable part magnetic member 30, and the variable part side bulkhead 40.

The variable part center bulkhead 20 is installed on a front surface of the variable part center roof rail 10, and the variable part magnetic member 30 is mounted on the variable part center bulkhead 20.

The variable part center roof rail 10 defines a space having a groove shape extending in the longitudinal direction of the variable part center roof rail 10 and opened at an upper side thereby. The variable part side bulkhead 40 is installed in the space. That is, the variable part center bulkhead 20 and the variable part magnetic member 30 are sequentially stacked and coupled to the front surface of one surface of the variable part center roof rail 10, and the variable part side bulkhead 40 is coupled to a rear surface of one surface of the variable part center roof rail 10.

The variable part side bulkheads 40 may be coupled to rear surfaces at two opposite sides of the variable part center bulkhead 20 with one surface of the variable part center roof rail 10 interposed therebetween. The variable part center bulkhead 20, the variable part magnetic member 30, and the variable part side bulkheads 40 may be fixed to one surface of the variable part center roof rail 10 by bolt members 25.

The center rail coupling member 19 is coupled to a rear surface of the other surface of the variable part center roof rail 10, and each of the variable part first left and right center roof rails 70 is coupled to the center rail coupling member 19 and extends toward the rear side of the vehicle body. In addition, the two opposite side portions of the rear surface of the variable part center roof rail 10 are connected to the rear roof side members 80 by way of roof front gussets 15.

With reference to FIG. 7, the variable part roof panel 50 may be coupled to an upper portion of the variable part center roof rail 10 and cover the groove-shaped space of the variable part center roof rail 10, and a lower portion of the variable part center roof rail 10 may be supported by a weather strip mounting bracket 60. In addition, with reference to FIG. 8, the variable part first left and right center roof rails 70 may be connected to the rear surface of the variable part center roof rail 10 by the center rail coupling members 19.

Figure 9:
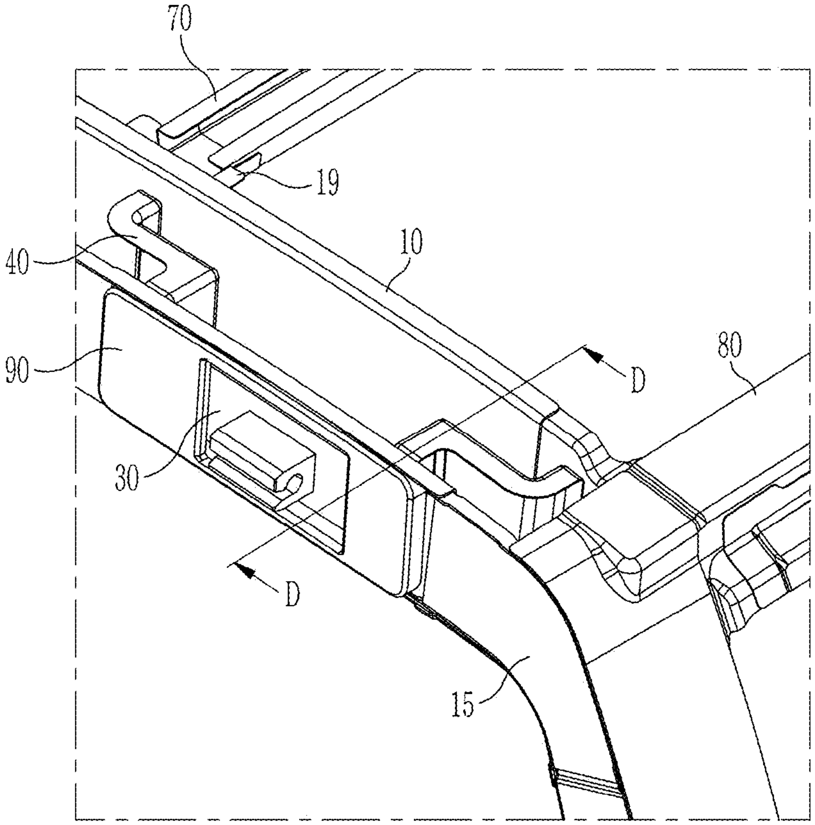
FIG. 9 is a perspective view illustrating a state in which the variable part coupling module, to which a variable part rubber bushing of the joint structure for a vehicle body according to an embodiment of the present disclosure is coupled, is installed on the variable part center roof rail.
Figure 10:
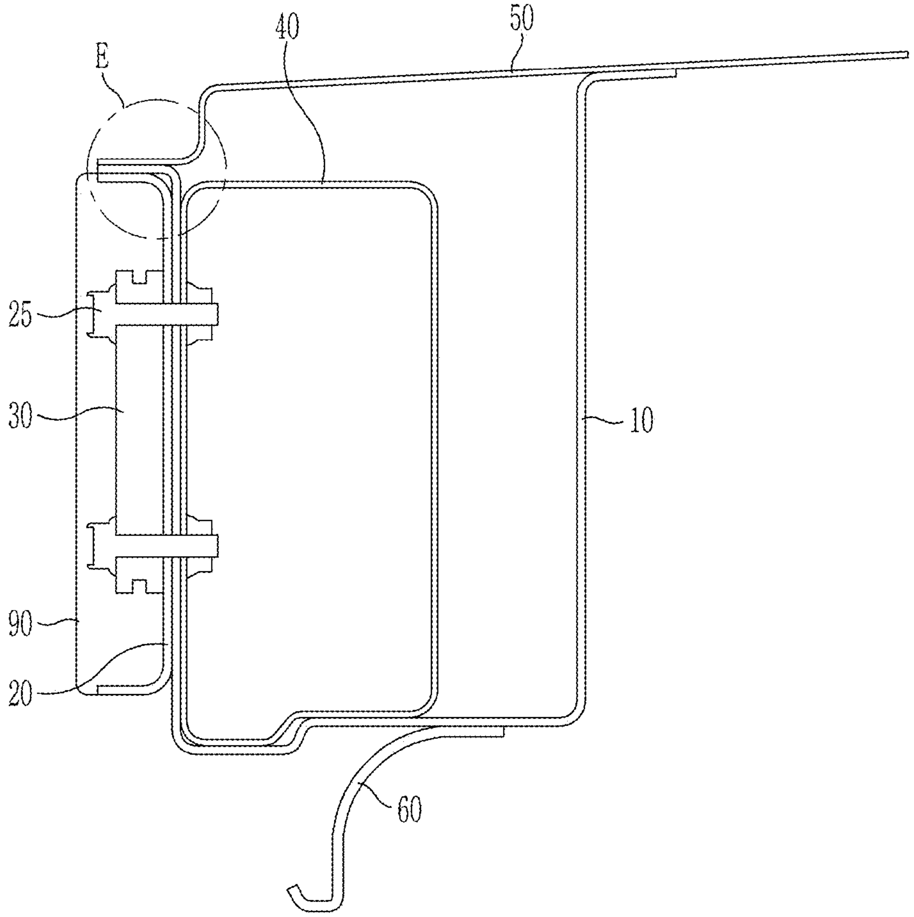
FIG. 10 is a cross-sectional view taken along line 'D-D' in FIG. 9.

FIG. 9 is a perspective view illustrating a state in which the variable part coupling module, to which a variable part rubber bushing of the joint structure for a vehicle body according to an embodiment of the present disclosure is coupled, is installed on the variable part center roof rail, and FIG. 10 is a cross-sectional view taken along line 'D-D' in FIG. 9.

With reference to FIG. 9, a variable part rubber bushing 90 may be coupled to a front surface of the variable part center bulkhead 20 and cover the variable part magnetic member 30. An opening may be formed in a central portion of the variable part rubber bushing 90 so that the variable part magnetic member 30 is exposed toward the front body module 1000. The variable part rubber bushing 90 may be made of rubber and serve to absorb vibration of the variable part magnetic member 30 and block electromagnetic waves.

With reference to FIG. 10, an end of the variable part center bulkhead 20 may be fitted with upper and lower ends of the variable part rubber bushing 90.

In addition, as indicated by 'E', an end of the variable part center roof rail 10, an end of the variable part center bulkhead 20, and an end of the variable part roof panel 50 may overlap one another at an upper side of the variable part rubber bushing 90.

In this case, the variable part magnetic member 30 may be positioned to be spaced apart from the variable part center roof rail 10, which is made of steel, at a predetermined interval, such that a space may be ensured, and a magnetic field generated from the variable part magnetic member 30 is prevented from being transmitted to the variable part center roof rail 10 by scattering.

In addition, because the variable part rubber bushing 90 made of rubber is in contact with and supported by the variable part center bulkhead 20 made of aluminum, an electric field is prevented from being transmitted to the variable part center roof rail 10.

Meanwhile, an additive with metal powder may be added to the rubber of the variable part rubber bushing 90 for vibration insulation, thereby improving the performance in blocking the electromagnetic field.

Figure 11:
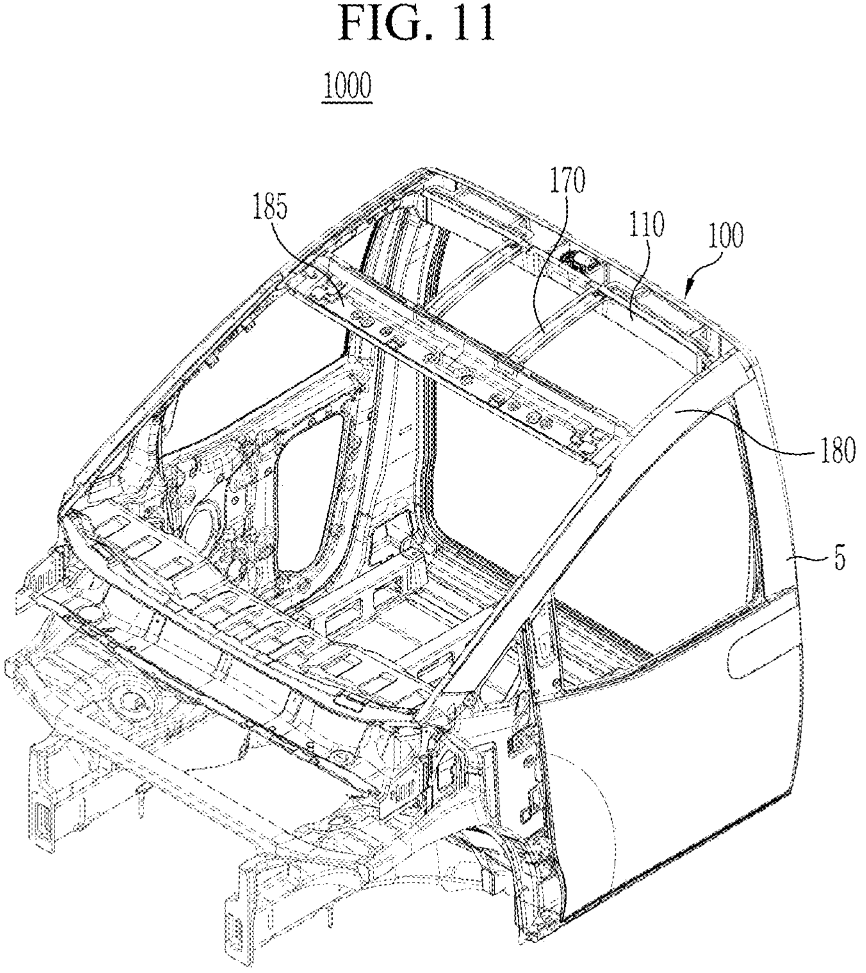
FIG. 11 is a perspective view illustrating a front body module of the joint structure for a vehicle body according to an embodiment of the present disclosure.

FIG. 11 is a perspective view illustrating the front body module of the joint structure for a vehicle body according to an embodiment of the present disclosure.

With reference to FIG. 11, the stationary part center roof rail 110 is installed on the upper portion of the rear edge of the front body module 1000 and extends in the direction perpendicular to the longitudinal direction of the vehicle. In addition, the plurality of stationary part coupling modules 100 is installed on the stationary part center roof rail 110.

The pair of stationary part first left and right center roof rails 170 may be coupled to a central portion of a front surface of the stationary part center roof rail 110 and extend in a direction perpendicular to an extension direction of the stationary part center roof rail 110. The front surface of the stationary part center roof rail 110 and the stationary part first left and right center roof rails 170 may be connected to one another by center rail coupling members 119. The stationary part first left and right center roof rails 170 extend toward a front side of the vehicle body and are connected to the front roof rail 185 at the front side of the vehicle body. The front roof rail 185 extends in a direction approximately parallel to the stationary part center roof rail 110, and two opposite sides of the front roof rail 185 are connected and fixed to two opposite sides of the front vehicle body 5 of the front body module 1000.

Meanwhile, a pair of front roof side members 180 may be coupled to two opposite side portions of the front surface of the stationary part center roof rail 110 and extend in the direction perpendicular to the extension direction of the stationary part center roof rail 110.

Figure 12:
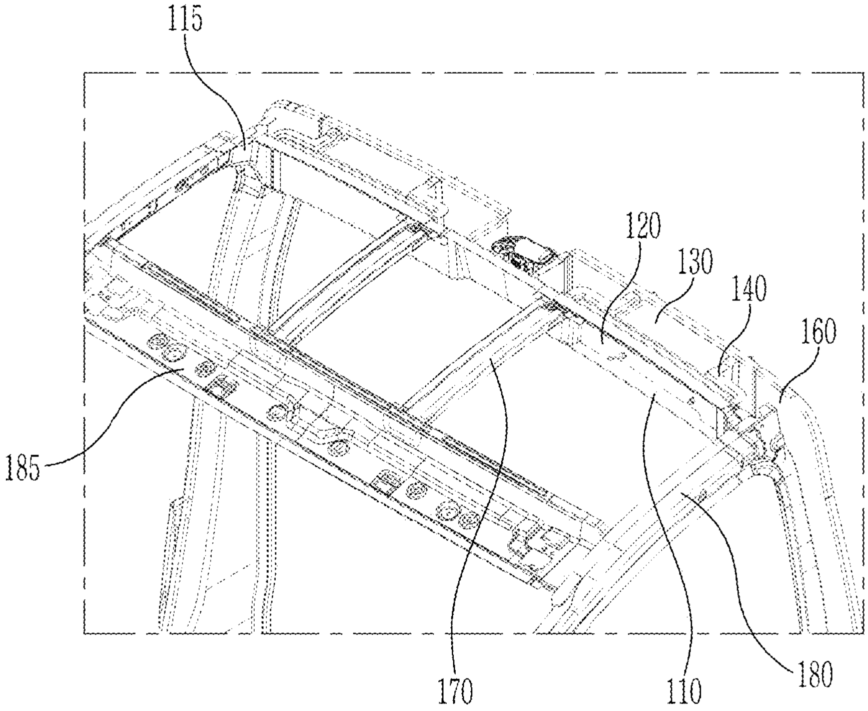
FIG. 12 is a view illustrating a coupling relationship between stationary part center roof rails of the joint structure for a vehicle body according to an embodiment of the present disclosure.
Figure 13:
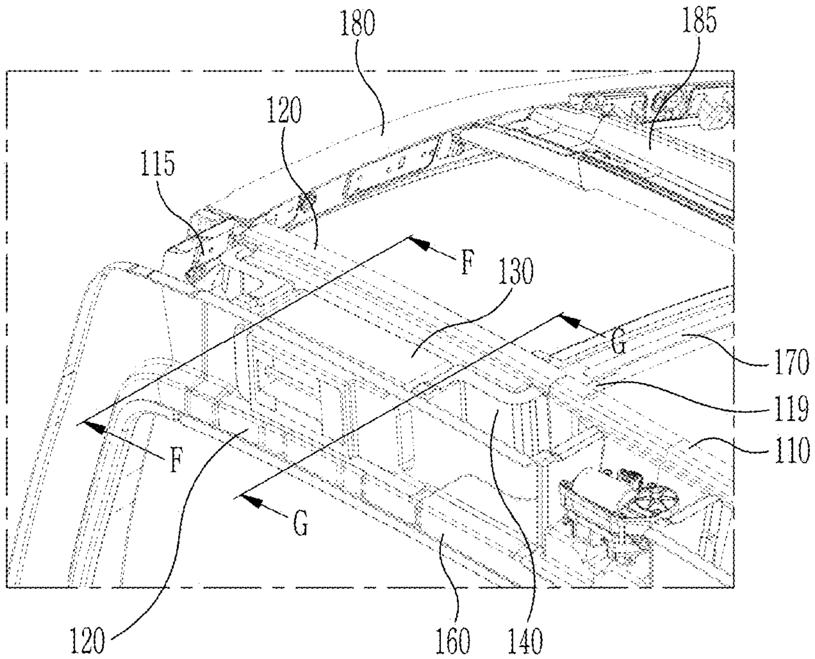
FIG. 13 is a perspective view illustrating a state in which a stationary part coupling module of the joint structure for a vehicle body according to an embodiment of the present disclosure is installed on the stationary part center roof rail.
Figure 14:
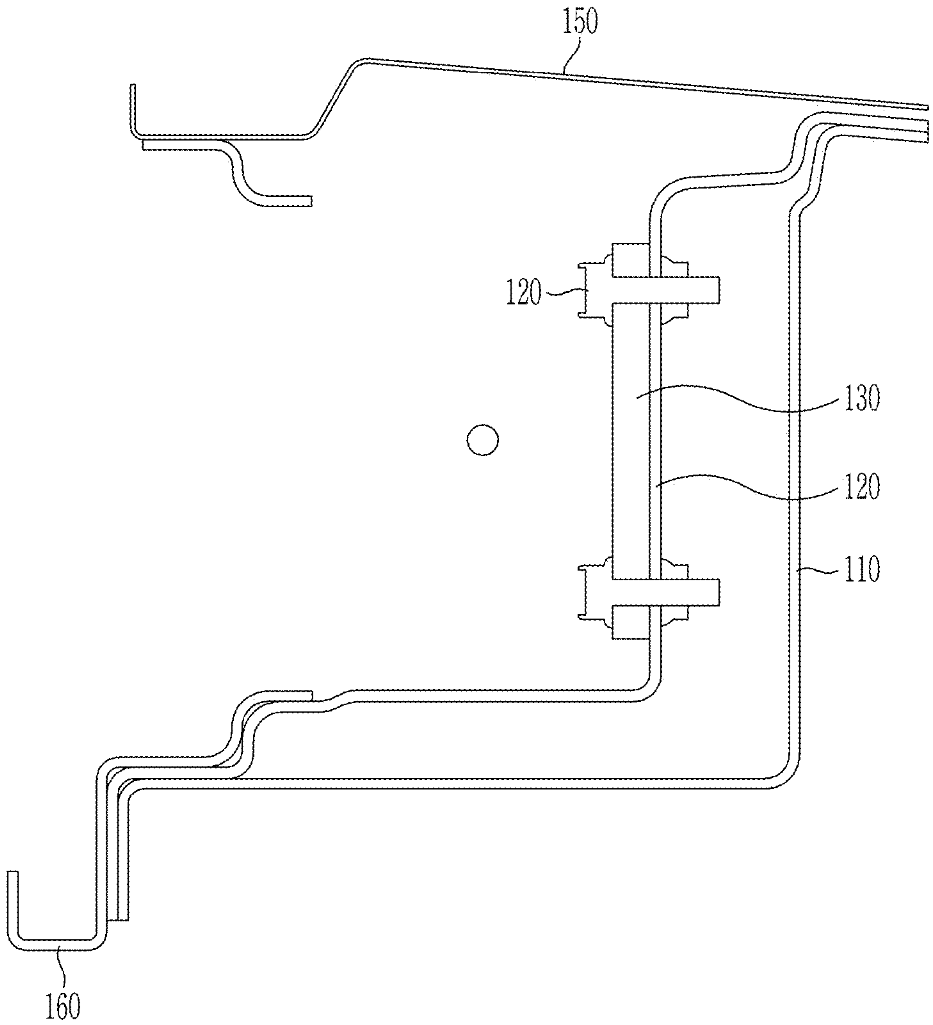
FIG. 14 is a cross-sectional view taken along line 'F-F' in FIG. 13.
Figure 15:
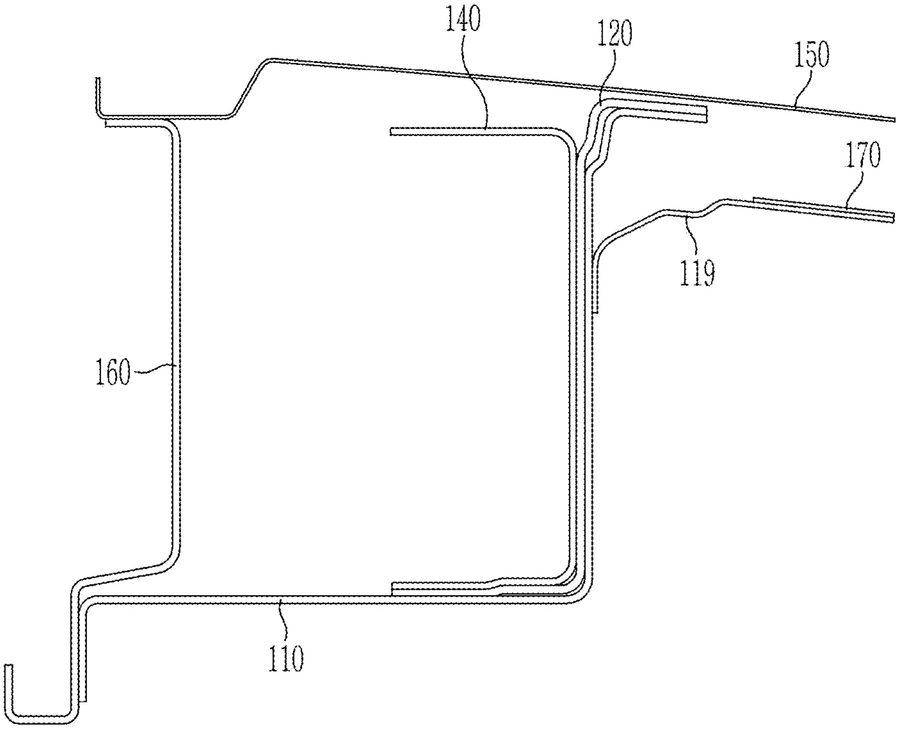
FIG. 15 is a cross-sectional view taken along line 'G-G' in FIG. 13.

FIG. 12 is a view illustrating a coupling relationship between the stationary part center roof rails of the joint structure for a vehicle body according to the embodiment of the present disclosure, FIG. 13 is a perspective view illustrating a state in which the stationary part coupling module of the joint structure for a vehicle body according to the embodiment of the present disclosure is installed on the stationary part center roof rail, FIG. 14 is a cross-sectional view taken along line 'F-F' in FIG. 13, and FIG. 15 is a cross-sectional view taken along line 'G-G' in FIG. 13.

With reference to FIG. 12, the stationary part center roof rail 110 is coupled together with a stationary part center roof rail extension member 160 and defines a space having a groove shape extending in the longitudinal direction of the stationary part center roof rail 110 and opened at an upper side thereof. The plurality of stationary part coupling modules 100 may include a stationary part center bulkhead 120, a stationary part magnetic member 130, and stationary part side bulkheads 140 and be installed in a space between the stationary part center roof rail 110 and the stationary part center roof rail extension member 160.

The structure of the front body module 1000 illustrated in FIG. 12 serves to effectively transmit and disperse a magnetic fastening load at the time of coupling the vehicle body. The fastening load of the magnetic member may be transmitted and dispersed to the front roof rail 185 and front roof side member 180 via the stationary part center bulkhead 120, the stationary part side bulkheads 140, the stationary part center roof rail 110, and the stationary part first left and right center roof rails 170, thereby improving rigidity in the forward/rearward direction and the leftward/rightward direction.

As illustrated in FIG. 13, the stationary part center bulkhead 120 is installed on a rear surface of the stationary part center roof rail 110, and the stationary part magnetic member 130 is mounted on the stationary part center bulkhead 120.

The stationary part center bulkhead 120 and the stationary part magnetic member 130 are sequentially stacked on and coupled to the rear surface of the stationary part center roof rail 110, and the stationary part side bulkhead 140 is coupled to the stationary part center bulkhead 120 and the stationary part center roof rail 110.

As illustrated in FIG. 14, the stationary part center bulkhead 120 and the stationary part magnetic member 130 may be fixed by bolt members 125. In addition, an end of a stationary part roof panel 150, an end of the stationary part center bulkhead 120, and an end of the stationary part center roof rail 110 may overlap one another at an upper side of the stationary part center roof rail 110. In addition, the stationary part center roof rail 110, the stationary part center bulkhead 120, and the stationary part center roof rail extension member 160 may be coupled while overlapping one another at a lower side of the stationary part center roof rail 110.

As illustrated in FIG. 15, the stationary part side bulkhead 140 may be coupled to the stationary part center roof rail 110 with the stationary part center bulkhead 120 interposed therebetween. In addition, the front surface of the stationary part center roof rail 110 and the stationary part first left and right center roof rails 170 may be connected to one another by the center rail coupling members 119.

Figure 16:
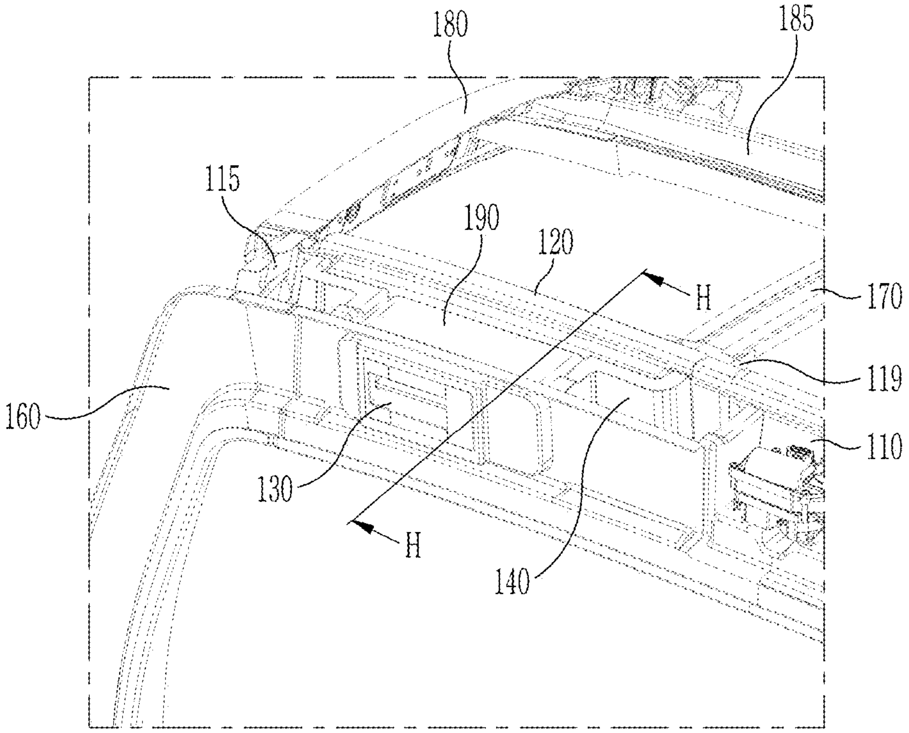
FIG. 16 is a perspective view illustrating a state in which the stationary part coupling module, to which the stationary part rubber bushing of the joint structure for a vehicle body according to an embodiment of the present disclosure is coupled, is installed on the stationary part center roof rail.
Figure 17:
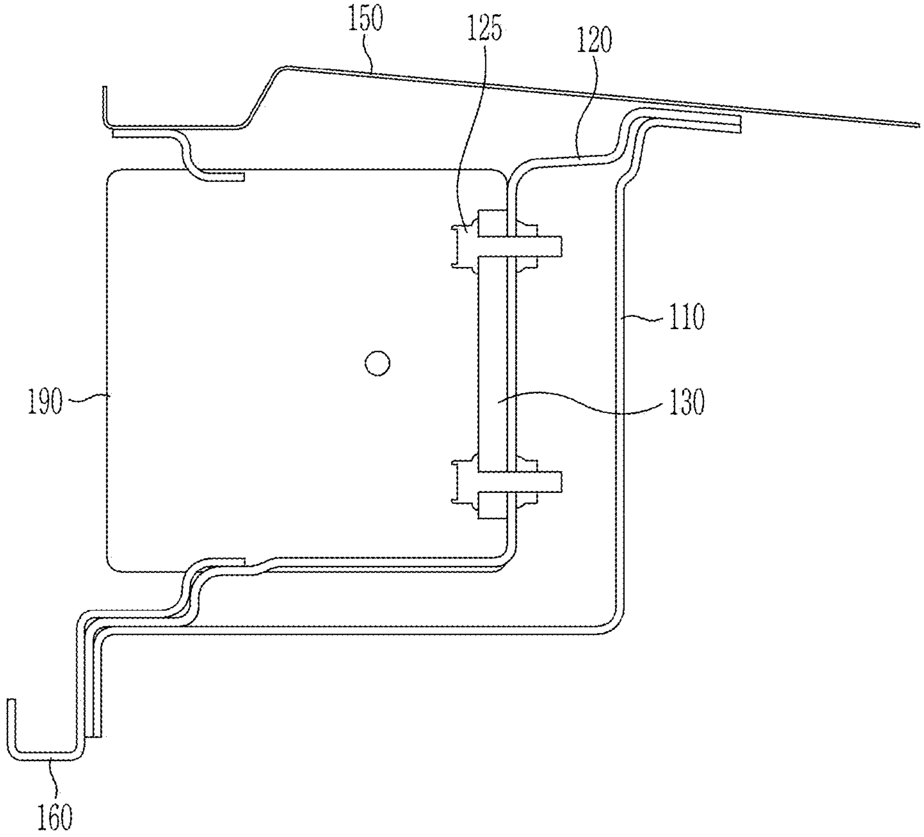
FIG. 17 is a cross-sectional view taken along line 'H-H' in FIG. 16.

FIG. 16 is a perspective view illustrating a state in which the stationary part coupling module, to which the stationary part rubber bushing of the joint structure for a vehicle body according to an embodiment of the present disclosure is coupled, is installed on the stationary part center roof rail, and FIG. 17 is a cross-sectional view taken along line 'H-H' in FIG. 16.

With reference to FIG. 16, a stationary part rubber bushing 190 may be coupled to a rear surface of the stationary part center bulkhead 120 and cover the stationary part magnetic member 130. An opening may be formed in a central portion of the stationary part rubber bushing 190 so that the stationary part magnetic member 130 is exposed toward the rear body module 2000. The stationary part rubber bushing 190 may be made of rubber and serve to absorb vibration of the stationary part magnetic member 130 and block electromagnetic waves.

With reference to FIG. 17, an end of the stationary part center bulkhead 120 may be fitted with upper and lower ends of the stationary part rubber bushing 190.

In addition, an end of the stationary part center roof rail 110, an end of the stationary part center bulkhead 120, and an end of the stationary part roof panel 150 may overlap one another at an upper side of the stationary part rubber bushing 190.

In this case, the stationary part rubber bushing 190 is positioned to be spaced apart from the stationary part center roof rail 110 at a predetermined interval by the stationary part center bulkhead 120, such that a space may be ensured between the stationary part magnetic member 130 and the stationary part center roof rail 110 made of steel. The ensured space may prevent the magnetic field, which is generated from the stationary part magnetic member 130, from being transmitted to the stationary part center roof rail 110 by scattering.

In addition, because the stationary part rubber bushing 190 made of rubber is in contact with and supported by the stationary part center bulkhead 120 made of aluminum, an electric field is prevented from being transmitted to the stationary part center roof rail 110.

Meanwhile, an additive with metal powder may be added to the rubber of the stationary part rubber bushing 190 for vibration insulation, thereby improving the performance in blocking the electromagnetic field.

As described above, according to embodiments of the present disclosure, it is possible to reduce costs required to change the upper body structure of the vehicle body to conform to various types of customized services provided by the PBV.

In addition, the structure of the vehicle body including the bulkhead, the center roof rail, the left and right center roof rails, and the rear roof rail is applied, such that the coupling rigidity and framework rigidity of the front body module and the rear body module, which may be attached to or detached from each other, may be ensured, and the mounting rigidity of the magnetic joint structure may be ensured.

In addition, the rubber bushing, which surrounds the magnetic member, may be applied, such that vibration of the magnetic joint structure may be absorbed, and electromagnetic waves may be blocked.

While the exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

The following reference identifiers may be used in connection with the drawings to describe various features of embodiments of the present disclosure.

| | |
|---|---|
| 1000: Front body module | 2000: Rear body module |
| 100: Stationary part coupling module | |
| 200: Variable part coupling module | |
| 10: Variable part center roof rail | |
| 20: Variable part center bulkhead | |
| 25: Bolt member | |
| 30: Variable part magnetic member | |
| 40: Variable part side bulkhead | 50: Variable part roof panel |
| 60: Weather strip mounting bracket | |
| 70: Variable part first left and right center roof rails | |
| 75: Variable part second left and right center roof rails | |
| 80: Rear roof side member | 85: Rear roof rail |
| 90: Variable part rubber bushing | |
| 110: Stationary part center roof rail | |
| 120: Stationary part center bulkhead | |
| 130: Stationary part magnetic member | |
| 140: Stationary part side bulkhead | 150: Stationary part roof panel |
| 160: Stationary part center roof rail extension member | |
| 170: Stationary part first left and right center roof rails | |
| 180: Front roof side member | 185: Front roof rail |
| 190: Stationary part rubber bushing | |

What is claimed is:

1. A joint structure for a vehicle body, the joint structure comprising:

a front body module that is a stationary part fixable to a front part of an under body of the vehicle body;

a rear body module that is a variable part having a preset shape, the rear body module being attachable to and detachable from a rear part of the under body and a rear part of the front body module;

a plurality of stationary part coupling modules disposed on an upper end surface portion of a rear edge of the front body module; and a plurality of variable part coupling modules disposed on an upper end surface portion of a front edge of the rear body module and couplable to the stationary part coupling modules by an electromagnetic force.

2. The joint structure of claim 1, wherein:

a variable part center roof rail is disposed on an upper portion of the front edge of the rear body module and extends in a direction perpendicular to a longitudinal direction of the vehicle body; and the plurality of variable part coupling modules is installed on the variable part center roof rail.

3. The joint structure of claim 2, wherein:

the variable part center roof rail defines a space opened at an upper side thereof;

a variable part roof panel is coupled to an upper portion of the variable part center roof rail and covers the opened space; and a lower portion of the variable part center roof rail is supported by a weather strip mounting bracket.

4. The joint structure of claim 3, wherein the plurality of variable part coupling modules comprises:

a variable part center bulkhead disposed on a front surface of the variable part center roof rail;

a variable part magnetic member disposed on the variable part center bulkhead; and variable part side bulkheads disposed in the space defined by the variable part center roof rail.

5. The joint structure of claim 4, wherein:

the variable part center bulkhead is coupled to a surface of the rear body module of the variable part center roof rail that is directed forward;

the variable part magnetic member is coupled to a front surface of the variable part center bulkhead;

the variable part side bulkheads are coupled to rear surfaces at two opposite sides of the variable part center bulkhead; and the variable part center bulkhead, the variable part magnetic member, and the variable part side bulkheads are fixed to the variable part center roof rail by bolt members.

6. The joint structure of claim 4, wherein:

a variable part rubber bushing is coupled to a front surface of the variable part center bulkhead and covers the variable part magnetic member; and an opening is disposed in a central portion of the variable part rubber bushing exposing the variable part magnetic member.

7. The joint structure of claim 6, wherein an end of the variable part center bulkhead is fitted with an end of the variable part rubber bushing.

8. The joint structure of claim 7, wherein an end of the variable part center roof rail, an end of the variable part center bulkhead, and an end of the variable part roof panel overlap one another at an upper side of the variable part rubber bushing.

9. The joint structure of claim 2, wherein:

a pair of variable part first left and right center roof rails is coupled to a central portion of a rear surface of the variable part center roof rail and extends in a direction perpendicular to an extension direction of the variable part center roof rail; and the pair of variable part first left and right center roof rails extends and is connected to a central portion of a rear roof rail at a rear side of the vehicle body.

10. The joint structure of claim 9, wherein a pair of rear roof side members is coupled to two opposite side portions of the rear surface of the variable part center roof rail and extends in the direction perpendicular to the extension direction of the variable part center roof rail.

11. The joint structure of claim 10, wherein two opposite sides of central portions of the variable part first left and right center roof rails are connected by lateral surfaces of the rear roof side members and variable part second left and right center roof rails.

12. A joint structure for a vehicle body, the joint structure comprising:

a front body module that is a stationary part fixed to a front part of an under body of the vehicle body;

a rear body module that is a variable part having a preset shape, the rear body module being attachable to and detachable from a rear part of the under body and a rear part of the front body module;

a stationary part center roof rail disposed on an upper portion of a rear edge of the front body module and extending in a direction perpendicular to a longitudinal direction of the vehicle body;

a plurality of stationary part coupling modules disposed on the stationary part center roof rail at an upper end surface portion of the rear edge of the front body module; and a plurality of variable part coupling modules disposed on an upper end surface portion of a front edge of the rear body module and couplable to the stationary part coupling modules by an electromagnetic force.

13. The joint structure of claim 12, wherein:

the stationary part center roof rail defines a space opened at an upper side thereof; and a stationary part roof panel is coupled to an upper portion of the stationary part center roof rail and covers the opened space.

14. The joint structure of claim 13, wherein the plurality of stationary part coupling modules comprises:

a stationary part center bulkhead disposed on a rear surface of the stationary part center roof rail;

a stationary part magnetic member disposed on the stationary part center bulkhead; and a stationary part side bulkhead disposed in the space defined by the stationary part center roof rail.

15. The joint structure of claim 14, wherein:

a stationary part rubber bushing is coupled to a rear surface of the stationary part center bulkhead and covers the stationary part magnetic member; and an opening is disposed in a central portion of the stationary part rubber bushing exposing the stationary part magnetic member.

16. The joint structure of claim 15, wherein an end of the stationary part center bulkhead is fitted with an end of the stationary part rubber bushing.

17. The joint structure of claim 16, wherein an end of the stationary part center roof rail is fixed to a front vehicle body by a stationary part center roof rail extension member.

18. The joint structure of claim 17, wherein an end of the stationary part center roof rail, an end of the stationary part center bulkhead, and an end of the stationary part center roof rail extension member overlap one another at a lower side of the stationary part rubber bushing.

19. The joint structure of claim 12, wherein:

a pair of stationary part first left and right center roof rails is coupled to a central portion of a front surface of the stationary part center roof rail and extends in a direction perpendicular to an extension direction of the stationary part center roof rail; and the pair of stationary part first left and right center roof rails extends and is connected to a central portion of a front roof rail at a front side of the vehicle body.

20. The joint structure of claim 19, wherein a pair of front roof side members is coupled to two opposite side portions of the front surface of the stationary part center roof rail and extends in the direction perpendicular to the extension direction of the stationary part center roof rail.

* * * * *